(12) United States Patent
Alizadeh-Khiavi et al.

(10) Patent No.: US 7,189,280 B2
(45) Date of Patent: Mar. 13, 2007

(54) ADSORPTIVE SEPARATION OF GAS STREAMS

(75) Inventors: Soheil Alizadeh-Khiavi, Burnaby (CA); Surajit Roy, Burnaby (CA); James A. Sawada, Vancouver (CA)

(73) Assignee: QuestAir Technologies Inc., Burnaby (CA)

( * ) Notice: Subject to any disclaimer, the term of this patent is extended or adjusted under 35 U.S.C. 154(b) by 176 days.

(21) Appl. No.: 10/881,775

(22) Filed: Jun. 29, 2004

(65) Prior Publication Data

US 2005/0284291 A1     Dec. 29, 2005

(51) Int. Cl.
    *B01D 53/04* (2006.01)
(52) U.S. Cl. ............... 95/130; 95/139; 95/140; 95/148; 96/132
(58) Field of Classification Search ............... 95/130, 95/139, 140, 148; 96/121, 131, 132, 143
    See application file for complete search history.

(56) References Cited

U.S. PATENT DOCUMENTS

| | | | |
|---|---|---|---|
| 3,094,569 A | 6/1963 | Thomas | |
| 3,204,388 A | 9/1965 | Asker | |
| 3,430,418 A | 3/1969 | Wagner | |
| 3,513,631 A | 5/1970 | Siebert et al. | |
| 3,564,816 A | 2/1971 | Batta | |
| 3,594,984 A | 7/1971 | Toyama et al. | |
| 3,636,679 A * | 1/1972 | Batta ............ | 95/100 |
| 3,847,672 A | 11/1974 | Trocciola et al. | |
| 3,865,924 A | 2/1975 | Gidaspow et al. | |
| 3,866,428 A * | 2/1975 | Simonet et al. ........ | 62/642 |
| 4,019,879 A | 4/1977 | Rabo et al. | |
| 4,144,037 A | 3/1979 | Armond et al. | |
| 4,153,434 A | 5/1979 | Settlemyer | |
| 4,200,682 A | 4/1980 | Sederquist | |
| 4,272,265 A | 6/1981 | Snyder | |
| 4,322,394 A | 3/1982 | Mezey et al. | |
| 4,354,859 A | 10/1982 | Keller et al. | |
| 4,406,675 A | 9/1983 | Dangieri et al. | |
| 4,452,612 A | 6/1984 | Mattia | |
| 4,530,705 A | 7/1985 | Firey | |
| 4,532,192 A | 7/1985 | Baker et al. | |
| 4,553,981 A | 11/1985 | Fuderer | |
| 4,555,453 A | 11/1985 | Appleby | |
| 4,578,214 A | 3/1986 | Jungerhans | |
| 4,587,114 A | 5/1986 | Hirai et al. | |
| 4,595,642 A | 6/1986 | Nakanishi et al. | |

(Continued)

FOREIGN PATENT DOCUMENTS

CA    1256038    6/1989

(Continued)

OTHER PUBLICATIONS

Carvill et al., "Sorption Enhanced Reaction Process," *AIChE Journal* 42(10):2765-2772, 1996.

(Continued)

*Primary Examiner*—Frank M. Lawrence
(74) *Attorney, Agent, or Firm*—Klarquist Sparkman, LLP

(57) ABSTRACT

A method and system for adsorptive separation of a feed gas mixture provides for increased system efficiency and product recovery. The requirement for purge gas streams consuming desired product gas to regenerate adsorption beds is reduced through an inventive method for adsorbent selection and adsorption bed and process design.

17 Claims, 1 Drawing Sheet

U.S. PATENT DOCUMENTS

| | | | |
|---|---|---|---|
| 4,696,682 A | 9/1987 | Hirai et al. | |
| 4,702,903 A | 10/1987 | Keefer | |
| 4,726,816 A | 2/1988 | Fuderer | |
| 4,743,276 A | 5/1988 | Nishida et al. | |
| 4,758,253 A | 7/1988 | Davidson et al. | |
| 4,759,997 A | 7/1988 | Ohyauchi et al. | |
| 4,781,735 A | 11/1988 | Tagawa et al. | |
| 4,783,433 A | 11/1988 | Tajima et al. | |
| 4,790,858 A | 12/1988 | Sircar | |
| 4,801,308 A | 1/1989 | Keefer | |
| 4,816,121 A | 3/1989 | Keefer | |
| 4,914,076 A | 4/1990 | Tsuji et al. | |
| 4,917,711 A | 4/1990 | Xie et al. | |
| 4,963,339 A | 10/1990 | Krishnamurthy et al. | |
| 4,968,329 A | 11/1990 | Keefer | |
| 4,969,935 A | 11/1990 | Hay | |
| 4,988,580 A | 1/1991 | Ohsaki et al. | |
| 4,994,331 A | 2/1991 | Cohen | |
| 5,068,159 A | 11/1991 | Kinoshita | |
| 5,079,103 A | 1/1992 | Schramm | |
| 5,082,473 A | 1/1992 | Keefer | |
| 5,096,469 A | 3/1992 | Keefer | |
| 5,096,470 A | 3/1992 | Krishnamurthy | |
| 5,100,635 A * | 3/1992 | Krishnamurthy et al. | 423/235 |
| 5,126,310 A | 6/1992 | Golden et al. | |
| 5,133,784 A | 7/1992 | Boudet et al. | |
| 5,147,735 A | 9/1992 | Ippommatsu et al. | |
| 5,175,061 A | 12/1992 | Hildebrandt et al. | |
| 5,227,598 A | 7/1993 | Woodmansee et al. | |
| 5,234,472 A * | 8/1993 | Krishnamurthy et al. | 95/98 |
| 5,245,110 A | 9/1993 | Van Dijk et al. | |
| 5,246,676 A | 9/1993 | Hay | |
| 5,248,325 A | 9/1993 | Kagimoto et al. | |
| 5,256,172 A | 10/1993 | Keefer | |
| 5,256,174 A | 10/1993 | Kai et al. | |
| 5,258,571 A | 11/1993 | Golden et al. | |
| 5,271,916 A | 12/1993 | Vanderborgh et al. | |
| 5,282,886 A | 2/1994 | Kobayashi et al. | |
| 5,328,503 A | 7/1994 | Kumar | |
| 5,360,679 A | 11/1994 | Buswell et al. | |
| 5,366,818 A | 11/1994 | Wilkinson et al. | |
| 5,393,326 A | 2/1995 | Engler et al. | |
| 5,411,578 A | 5/1995 | Watson | |
| 5,415,748 A | 5/1995 | Emiliani et al. | |
| 5,429,665 A | 7/1995 | Botich | |
| 5,431,716 A | 7/1995 | Ebbeson | |
| 5,434,016 A | 7/1995 | Benz et al. | |
| 5,441,559 A | 8/1995 | Petit et al. | |
| 5,487,775 A | 1/1996 | LaCava et al. | |
| 5,509,956 A | 4/1996 | Opperman et al. | |
| 5,523,326 A | 6/1996 | Dandekar et al. | |
| 5,529,763 A | 6/1996 | Peng et al. | |
| 5,529,970 A | 6/1996 | Peng | |
| 5,531,809 A | 7/1996 | Golden et al. | |
| 5,543,238 A | 8/1996 | Strasser | |
| 5,593,478 A | 1/1997 | Hill et al. | |
| 5,604,047 A | 2/1997 | Bellows et al. | |
| 5,632,807 A | 5/1997 | Tomita et al. | |
| 5,645,950 A | 7/1997 | Benz et al. | |
| 5,646,305 A | 7/1997 | Wagner et al. | |
| 5,656,067 A | 8/1997 | Watson et al. | |
| 5,658,370 A | 8/1997 | Vigor et al. | |
| 5,711,926 A | 1/1998 | Knaebel | |
| 5,714,276 A | 2/1998 | Okamoto | |
| 5,766,311 A | 6/1998 | Ackley et al. | |
| 5,811,201 A | 9/1998 | Skowronski | |
| 5,827,358 A | 10/1998 | Kulish et al. | |
| 5,876,486 A | 3/1999 | Steinwandel et al. | |
| 5,891,217 A | 4/1999 | Lemcoff et al. | |
| 5,900,329 A | 5/1999 | Reiter et al. | |
| 5,917,136 A | 6/1999 | Gaffney et al. | |
| 5,925,322 A | 7/1999 | Werth | |
| 5,955,039 A | 9/1999 | Dowdy | |
| 5,958,109 A | 9/1999 | Fuderer | |
| 5,968,680 A | 10/1999 | Wolfe et al. | |
| 5,980,857 A | 11/1999 | Kapoor et al. | |
| 5,981,096 A | 11/1999 | Horburg et al. | |
| 5,998,056 A | 12/1999 | Divisek et al. | |
| 6,022,399 A | 2/2000 | Ertl et al. | |
| 6,045,933 A | 4/2000 | Okamoto | |
| 6,048,384 A * | 4/2000 | Smolarek | 95/98 |
| 6,051,050 A | 4/2000 | Keefer et al. | |
| 6,056,804 A | 5/2000 | Keefer et al. | |
| 6,060,032 A | 5/2000 | Hable et al. | |
| 6,063,161 A | 5/2000 | Keefer et al. | |
| 6,074,459 A * | 6/2000 | Gingrich et al. | 95/118 |
| 6,077,620 A | 6/2000 | Pettit | |
| 6,090,312 A | 7/2000 | Ziaka et al. | |
| 6,106,593 A * | 8/2000 | Golden et al. | 95/120 |
| 6,143,057 A | 11/2000 | Bülow et al. | |
| 6,162,558 A | 12/2000 | Borup et al. | |
| 6,176,897 B1 | 1/2001 | Keefer | |
| 6,190,623 B1 | 2/2001 | Sanger et al. | |
| 6,190,791 B1 | 2/2001 | Hornburg | |
| 6,200,365 B1 | 3/2001 | Eimer et al. | |
| 6,210,822 B1 | 4/2001 | Abersfelder et al. | |
| 6,231,644 B1 | 5/2001 | Jain et al. | |
| 6,255,010 B1 | 7/2001 | George et al. | |
| 6,283,723 B1 | 9/2001 | Milburn et al. | |
| 6,293,998 B1 | 9/2001 | Dolan et al. | |
| 6,296,823 B1 | 10/2001 | Ertl et al. | |
| 6,312,843 B1 | 11/2001 | Kimbara et al. | |
| 6,319,303 B1 * | 11/2001 | Guillard et al. | 95/97 |
| 6,398,853 B1 | 6/2002 | Keefer et al. | |
| 6,406,523 B1 | 6/2002 | Connor et al. | |
| 6,428,915 B1 | 8/2002 | Ban et al. | |
| 6,503,299 B2 * | 1/2003 | Baksh et al. | 95/98 |
| 6,607,854 B1 | 8/2003 | Rehg et al. | |
| 6,692,545 B2 | 2/2004 | Gittleman et al. | |
| 6,902,602 B2 * | 6/2005 | Keefer et al. | 95/97 |
| 6,921,597 B2 | 7/2005 | Keefer et al. | |
| 2001/0047824 A1 | 12/2001 | Hill et al. | |
| 2002/0004157 A1 | 1/2002 | Keefer et al. | |
| 2002/0073845 A1 * | 6/2002 | Reddy | 95/96 |
| 2002/0098394 A1 * | 7/2002 | Keefer et al. | 429/13 |
| 2002/0104518 A1 | 8/2002 | Keefer et al. | |
| 2002/0110503 A1 | 8/2002 | Gittleman et al. | |
| 2002/0110504 A1 | 8/2002 | Gittleman et al. | |
| 2002/0112479 A1 | 8/2002 | Keefer et al. | |
| 2002/0127442 A1 | 9/2002 | Connor et al. | |
| 2002/0142198 A1 | 10/2002 | Towler et al. | |
| 2002/0142208 A1 | 10/2002 | Keefer et al. | |
| 2003/0105376 A1 | 6/2003 | Foral et al. | |
| 2003/0143448 A1 | 7/2003 | Keefer | |
| 2003/0157390 A1 | 8/2003 | Keefer et al. | |
| 2003/0200866 A1 * | 10/2003 | Weyrich et al. | 95/129 |
| 2004/0005492 A1 | 1/2004 | Keefer et al. | |
| 2004/0131912 A1 | 7/2004 | Keefer et al. | |
| 2005/0252374 A1 * | 11/2005 | Henzler et al. | 95/96 |

FOREIGN PATENT DOCUMENTS

| | | |
|---|---|---|
| CA | 2016045 | 8/1994 |
| CA | 2109055 | 2/1999 |
| CA | 2087972 | 1/2000 |
| CA | 2287039 | 4/2000 |
| CA | 2087973 | 1/2001 |
| CA | 2325214 | 5/2001 |
| DE | 3913581 A1 | 10/1990 |
| EP | 0 143 537 A2 | 6/1985 |
| EP | 0 341 189 A1 | 8/1989 |
| EP | 0 345 908 A1 | 12/1989 |
| EP | 0 143 537 B1 | 3/1990 |
| EP | 0 490 632 A1 | 6/1992 |

| | | |
|---|---|---|
| EP | 0 545 559 A2 | 6/1993 |
| EP | 0 579 289 A2 | 1/1994 |
| EP | 0 681 860 A2 | 11/1995 |
| EP | 0 681 860 A3 | 7/1996 |
| EP | 0 691 701 A1 | 10/1996 |
| EP | 0 737 648 A2 | 10/1996 |
| EP | 0 750 361 A1 | 12/1996 |
| EP | 0 751 045 A2 | 1/1997 |
| EP | 0 853 967 A2 | 7/1998 |
| EP | 1 070 531 A2 | 1/2001 |
| EP | 1 095 689 A1 | 5/2001 |
| EP | 1 172 772 A2 | 1/2002 |
| EP | 1 230 966 A1 | 8/2002 |
| GB | 2 042 365 | 9/1980 |
| JP | 59-075574 A | 4/1984 |
| JP | 62-278770 | 3/1987 |
| JP | 62-274561 | 11/1987 |
| JP | 63-034862 A | 2/1988 |
| JP | 63-166137 | 7/1988 |
| JP | 63-228572 A | 9/1988 |
| JP | 04-206161 A | 7/1992 |
| JP | 05-166528 | 7/1993 |
| JP | 07-094200 | 7/1995 |
| JP | 08-045526 A2 | 2/1996 |
| JP | 10-027621 A | 1/1998 |
| JP | 10-0325360 A | 12/1998 |
| JP | 11-214021 A2 | 8/1999 |
| WO | WO 94/04249 | 3/1994 |
| WO | WO 96/13871 | 5/1996 |
| WO | WO 98/29182 | 7/1998 |
| WO | WO 99/19249 A1 | 4/1999 |
| WO | WO 99/28013 | 6/1999 |
| WO | WO 99/46032 | 9/1999 |
| WO | WO 00/16425 A1 | 3/2000 |
| WO | WO 00/16880 | 3/2000 |
| WO | WO 00/76630 A1 | 12/2000 |
| WO | WO 01/47050 | 6/2001 |
| WO | WO 02/24309 A1 | 3/2002 |
| WO | WO 02/35623 A2 | 5/2002 |
| WO | WO 02/37590 | 5/2002 |
| WO | WO 02/45821 | 6/2002 |
| WO | WO 02/47797 A1 | 6/2002 |
| WO | WO 02/056400 | 7/2002 |

OTHER PUBLICATIONS

Chatsiriwech et al., "Enhancement of Catalytic Reaction by Pressure Swing Adsorption," *Catalysis Today* 20:351-366, 1994.

Ding et al., "Equilibria and Kinetics of $CO_2$ Adsorption on Hydrotalcite Adsorbent," *Chemical Engineering Science* 55:3461-3474, 2000.

Ding et al., "Adsorption-Enhanced Steam-Methane Reforming," *Chemical Engineering Science* 55:3929-3940, 2000.

Hufton et al., "Sorption-Enhanced Reaction Process for Hydrogen Production," *AIChE Journal* 45(2):248-256, 1999.

Iyuke et al., "Application of Sn-Activated Carbon in Pressure Swing Adsorption for Purification of H2," *Chemical Engineering Science* 55:4745-4755, 2000.

Vaporciyan et al., "Periodic Separating Reactors: Experiments and Theory," *AIChE Journal* 35:831-844, 1989.

"Fuel Cells for Transportation 98," *National Laboratory Annual Progress Report*, U.S. Department of Energy, Office of Advanced Automotive Technologies, "CO Clean-up R&D," Argonne National Laboratory, pp. 33-36, 1998.

International Search Report from International Application No. PCT/CA99/00823.

International Search Report from International Application No. PCT/CA02/00368.

International Search Report From International Application No. PCT/CA2005/001014.

* cited by examiner

ADSORPTIVE SEPARATION OF GAS STREAMS

FIELD

The present disclosure relates to adsorptive separation, and more particularly to an improved method and apparatus for adsorptive separation of gas streams.

BACKGROUND

Adsorptive processes are an established means of separation used to separate gas phase components in multicomponent gas streams found in many industrial applications. Many industrial gas streams contain contaminant components which may be advantageously separated from the gas stream prior to some downstream use. Adsorptive separation processes have been adapted for use in many such industrial applications.

Thermal and pressure swing adsorption processes (TSA and PSA) as known in the prior art have both been successfully adapted to remove contaminant components from commercially important gas streams, making use of specialized adsorbent materials to adsorb contaminants from the input, or feed gas stream, leaving the desired product gas stream substantially free of the contaminants. Such adsorbent materials may then be cyclically regenerated to subsequently desorb the contaminant component which may be exhausted or otherwise disposed, prior to re-use of the adsorbent material.

In conventional adsorptive separation systems, the regeneration of the adsorbent material(s) requires the application of a purge stream that is substantially free of the contaminant component in contact with the adsorbent, in order to effectively desorb the contaminant component from the adsorbent material. In the case of TSA, the purge stream is heated to a temperature sufficient to desorb the contaminant from the adsorbent. In the case of PSA, purified product gas is typically used to purge the contaminant from the adsorbent. Such purge gas must typically be selected from gases external to the available feed gas stream, such as in the case of a TSA system, an exemplary heated inert (substantially free of contaminant component(s) and other gas components which may inhibit desorption and purge of the adsorbed contaminant from the adsorbent material) purge gas, or purified product gas in the case of a PSA system. The use of such contaminant free purge gas streams typically influence the efficiency of the adsorptive process, by reducing product recovery in the case of PSA, and/or increasing the cost such as in the provision of a suitable heated contaminant-free purge gas stream in the case of TSA. In all cases, the overall achievable efficiency of the adsorptive separation system is limited by the quantity and cost (in terms of external gas and heat energy or lost product gas) of purge gas required to desorb the contaminant from the adsorbent material during regeneration.

SUMMARY OF THE DISCLOSURE

In a first embodiment, the present disclosure relates to a method for substantially separating a contaminant gas component from a feed gas stream comprising at least the contaminant gas component, a diluent gas component and a desired product gas component.

The method comprises the steps of:
(a) providing a first adsorbent material in a first adsorption zone wherein the first adsorbent material is selective for the contaminant component relative to the diluent component, and a second adsorbent material in a second adsorption zone wherein the second adsorbent material is selective for the diluent component relative to the desired product component;

(b) passing the feed gas stream through the first adsorption zone in contact with the first adsorbent material such that the contaminant component is substantially adsorbed on the first adsorbent material, and subsequently through the second adsorption zone in contact with the second adsorbent material such that at least a portion of the diluent component is adsorbed on the second adsorbent material;

(c) withdrawing from the second adsorption zone a product gas stream enriched in the desired product component relative to the feed gas stream;

(d) regenerating the first adsorption zone by passing an exhaust gas stream comprising at least a portion of the adsorbed diluent component from the second adsorption zone through the first adsorption zone, such that at least a portion of the contaminant component adsorbed on the first adsorbent material is purged from the first adsorption zone by the diluent component.

In an exemplary embodiment of the above-described method, the contaminant component may comprise carbon monoxide, the diluent component may comprise carbon dioxide, and the desired product component may comprise hydrogen. In such an embodiment, the feed gas stream may be a reformate stream from a steam catalytic reformer. In another embodiment, the aforementioned diluent component may additionally comprise nitrogen. In such an embodiment, the feed gas stream may be a reformate stream from a catalytic partial oxidation reformer.

In a further embodiment of the method, the contaminant component may comprise carbon dioxide, the diluent component may comprise nitrogen, and the desired product component may comprise methane. In such an embodiment, the feed gas stream may be an impure natural gas, landfill gas, or biogas stream.

In any of the above embodiments, the feed gas stream may additionally comprise a second contaminant component, which may be substantially adsorbed on a third adsorbent material contained in a third adsorption zone, wherein the third adsorbent material is selective for the second contaminant component relative to the diluent component. In such an embodiment, the third adsorption zone may be regenerated by passing the exhaust gas stream comprising at least a portion of the adsorbed diluent component from the second adsorption zone through the third adsorption zone, such that at least a portion of the second contaminant component adsorbed on the third adsorbent material is purged from the third adsorption zone by the diluent component.

Also disclosed is an adsorptive separation system for substantially separating a contaminant gas component from a feed gas stream comprising at least the contaminant gas component, a diluent gas component and a desired product gas component. The system comprises:

(a) an adsorption bed comprising a first adsorption zone containing a first adsorbent material selective for the contaminant component relative to the diluent component, and a second adsorption zone containing a second adsorbent material selective for the diluent component relative to the desired product component;

(b) a feed gas inlet valve for admitting the feed gas stream into the adsorption bed such that the feed gas stream passes through the first adsorption zone in contact with the first adsorbent material such that the contaminant component is substantially adsorbed on the first adsorbent material, and subsequently through the second adsorption zone in contact with the second adsorbent material such that at least a portion of the diluent component is adsorbed on the second adsorbent material;

(c) a product gas outlet valve for withdrawing a product gas stream enriched in the desired product component relative to the feed gas stream from the adsorption bed; and (d) an exhaust gas outlet valve for withdrawing an exhaust gas stream from the adsorption bed during regeneration of the adsorption bed, said exhaust gas stream comprising at least a portion of the adsorbed diluent component from the second adsorption zone and at least a portion of the adsorbed contaminant component from the first adsorption zone which has been purged from the first adsorbent material by the passage of the portion of the diluent component in contact with the first adsorbent material.

In an exemplary embodiment of the above system, the contaminant component may comprise carbon monoxide, the diluent component may comprise carbon dioxide, and the desired product component may comprise hydrogen. In such an embodiment, the feed gas stream may be a reformate stream from a steam catalytic reformer. In another embodiment, the aforementioned diluent component may additionally comprise nitrogen. In such an embodiment, the feed gas stream may be a reformate stream from a catalytic partial oxidation reformer.

In a further embodiment of the system, the contaminant component may comprise carbon dioxide, the diluent component may comprise nitrogen, and the desired product component may comprise methane. In such an embodiment, the feed gas stream may be an impure natural gas, landfill gas, or biogas stream.

In any of the above system embodiments, the feed gas stream may additionally comprise a second contaminant gas component, and the adsorption bed may additionally comprise a third adsorption zone containing a third adsorbent material selective for the second contaminant component relative to the diluent component. In such embodiments, the feed gas stream may pass through the third adsorption zone in contact with the third adsorbent material prior to passing through the second adsorption zone such that the second contaminant component is substantially adsorbed on the third adsorbent material, and the exhaust gas stream may additionally comprise at least a portion of the adsorbed second contaminant component from the third adsorption zone which has been purged from the third adsorbent material by the passage of the portion of the diluent component in contact with the third adsorbent material.

By way of example, a contaminant component of a feed gas stream may be defined to comprise any one or more gaseous species present in a feed gas stream to be separated by the methods and systems, that must be substantially separated from the desired product component in order to produce a product gas stream enriched in the desired product component that is suitable for use in a chosen downstream product or process. A diluent component of a feed gas stream may be defined to comprise any one or more gaseous species present in a feed gas stream to be separated by the methods and systems, that is desirably reduced in concentration relative to the concentration of the desired product component in the product gas stream compared to the feed stream in order to provide a product gas stream suitably enriched in the desired product component. The relative selectivity of an adsorbent material for a first gas component over a second gas component may be understood to mean that the adsorbent material has a greater adsorptive capacity for the first gas component relative to the second gas component at the adsorptive conditions (total and partial pressure, temperature, feed stream composition, etc.) present during the adsorption phase of the separation cycle of concern in a particular application.

DETAILED DESCRIPTION OF SEVERAL EMBODIMENTS

Figure 1:
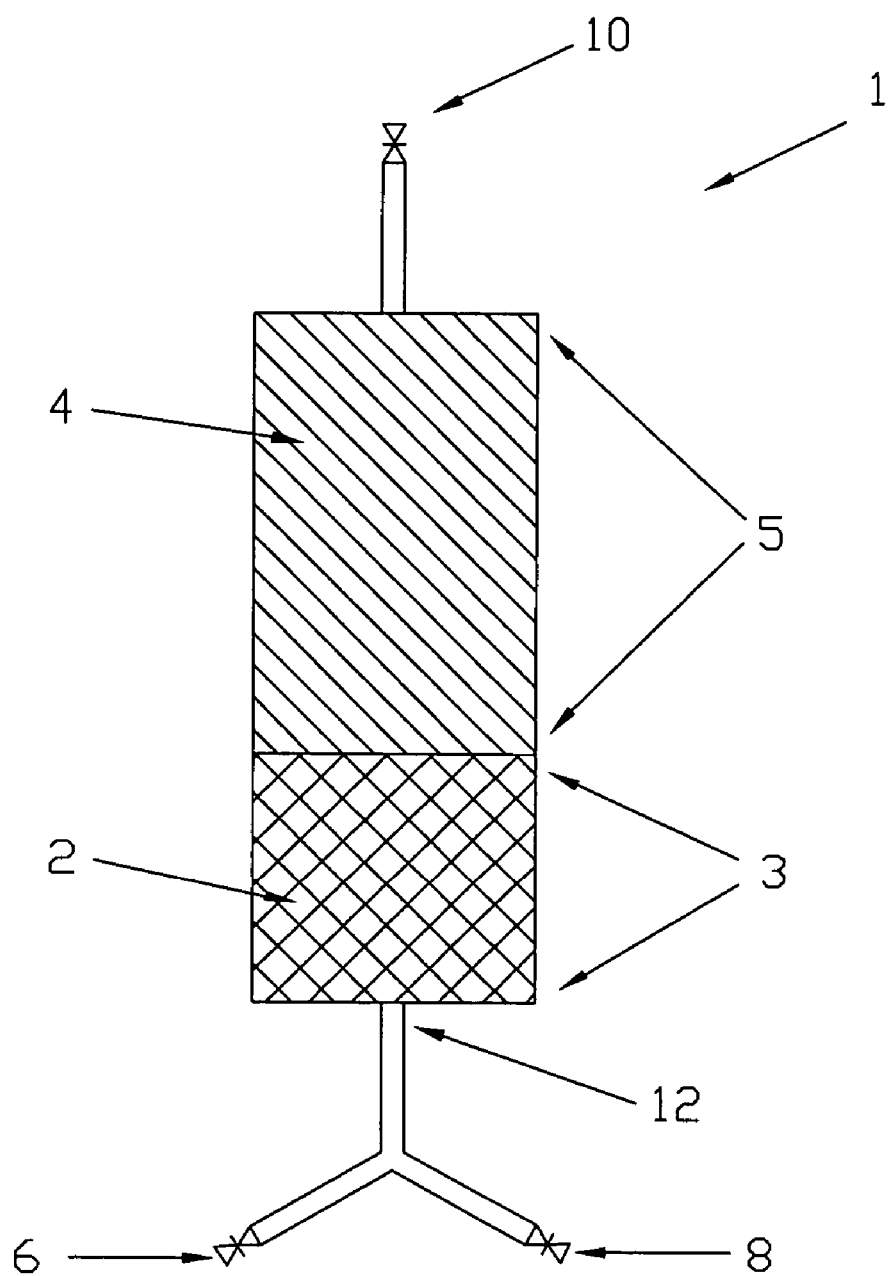
FIG. 1 is a schematic diagram showing the structure of a presently disclosed adsorption bed and associated portions of an adsorptive separation system.

Disclosed herein are methods and systems for substantially separating a contaminant gas component from a feed gas stream comprising at least the contaminant gas component, a diluent gas component and a desired gas component, by means of adsorptive separation. The method and associated system utilize at least a first and second adsorbent materials, contained in at least first and second adsorption zones respectively, which may be typically enclosed inside at least one adsorption bed. The first and second adsorbent materials may be compositionally distinct from each other, and may be selected based on their adsorption characteristics relative to the contaminant, diluent and desired product gas components of the feed gas stream for a desired adsorptive separation application. The first adsorbent material is chosen such that it is adsorptively selective for the contaminant component, relative to the diluent component, so that when the feed gas is passed through the first adsorption zone in contact with the first adsorbent material, the contaminant component in substantially adsorbed on the first adsorbent material, and thereby substantially removed from the feed gas stream. The second adsorbent material is chosen such that it is adsorptively selective for the diluent component relative to the desired product component, so that when the feed gas stream is passed through the second adsorption zone in contact with the second adsorbent material, subsequent to passing through the first zone, at least a portion of the diluent component of the feed gas stream is adsorbed on the second adsorbent material.

In the adsorptive separation processes contemplated by the presently disclosed method and system, the at least one adsorption bed and contained adsorbent materials must be regenerated following adsorption of the at least one contaminant component, in order to desorb the adsorbed gas components from the adsorbent materials, to enable further cyclic adsorptive separation steps. In the case of application to a PSA process, adsorption may take place inside the adsorption bed at an elevated pressure and regeneration may be accomplished by the reduction of pressure in the bed and by the passage of a purge gas stream through the bed (and therefore the adsorption zones and adsorbent materials therein) to desorb the at least one adsorbed contaminant component. In the case of application to a TSA process, adsorption may take place inside the adsorption bed at a lower temperature (either of the feed gas stream or of the adsorption bed itself) and regeneration may be accomplished at a higher temperature (either by heating of the purge gas stream or the adsorption bed itself such as by resistively heating an adsorbent support material) by the passage of a purge gas stream through the bed (and the adsorption zone and adsorbent materials therein) to desorb the at least one adsorbed contaminant component. In an application to a displacement purge adsorption process, adsorption and regeneration may take place at similar pressures and temperatures, and desorption of the at least one contaminant component may be accomplished primarily by the passage of a purge gas stream through the adsorption bed. Such a purge gas stream may typically be substantially free of the contaminant to be removed from the feed gas mixture, and may contain a component that is relatively weakly adsorbed or not adsorbed on the selected adsorbent materials used in the adsorption process, in order to provide a purging action to desorb at least a portion of the contaminant component from the adsorption bed.

The presently disclosed methods and systems may improve the efficiency of adsorptive separation processes by reducing the requirement for providing external substantially contaminant-free purge gas volumes for regenerative desorption of the contaminant component from the first adsorbent material.

According to the presently disclosed methods and systems, during regeneration of the adsorbent materials, an exhaust gas is passed through the adsorption beds (and thereby through the adsorption zones and in contact with the adsorbent materials) in a direction opposite to the flow of the feed gas stream during an initial adsorption step. The exhaust gas comprises at least a portion of the diluent component that was previously adsorbed on the second adsorbent material which passes through the first adsorption zone in contact with the first adsorbent material. The portion of the diluent component in the exhaust gas serves to desorb and purge at least a portion of the contaminant component adsorbed on the first adsorbent material. In the case of PSA process application, the passage of the desorbed diluent-containing exhaust gas through the first adsorption zone is known as a countercurrent blowdown step. The function of the desorbed diluent component gas to purge at least a portion of the adsorbed contaminant component from the adsorption bed in the method and systems of the present invention reduces the requirement (may reduce the volume, heating and/or product gas component content of the purge gas stream required) for external substantially contaminant-free purge gas volumes during regeneration of the adsorbent materials in the adsorption beds, thereby increasing overall system efficiency with respect to the energy consumption or product recovery of the system. In the case of application of the methods and systems to PSA processes, the recovery of the desired product component may also be increased due to reduced consumption of product component gas in the regeneration of the adsorbent materials in the adsorption beds.

With reference to FIG. 1, an exemplary adsorption bed 1 is schematically depicted. The exemplary bed comprises first and second adsorption zones 3, 5 which contain first and second adsorbent materials 2, 4, respectively. Feed inlet valve 6 is provided to admit a feed gas mixture comprising contaminant, diluent and product gas components to the end of the adsorption bed 1 proximal to the first adsorption zone 3. Product gas outlet valve 10 is provided to withdraw a product gas enriched in the desired product gas component from the end of the adsorption bed 1 distant from the first adsorption zone 3. Exhaust gas outlet valve 8 is provided to withdraw an exhaust gas stream comprising at least a portion of the adsorbed diluent component (which was adsorbed on the second adsorbent material, 4) from the second adsorption zone 5 and at least a portion of the adsorbed contaminant component from the first adsorption zone 3 which has been purged from the first adsorbent material 2 by the passage of the portion of the diluent component in contact with the first adsorbent material 2. In FIG. 1, feed gas inlet valve 6 and exhaust gas outlet valve 8 are shown communicating with the end of the adsorption bed 1 proximal to the first adsorption zone 3 through a common gas port 12, however, the valves may optionally communicate individually with the adsorption bed for admission of feed gas, and withdrawal of exhaust gas.

In another embodiment, the adsorption bed configuration may be applied to a rotary adsorption system, whereby multiple similar adsorption beds may be relatively rotatable with respect to one or more rotary valves common to the multiple adsorption beds, wherein the rotary valves comprise the feed gas inlet, product gas outlet, and exhaust gas outlet valves referred to in the previous exemplary embodiment, such as is disclosed in detail in the multiple bed rotary adsorption system arrangements described in U.S. Pat. Nos. 6,451,095 and RE38,493, the contents of which are herein incorporated by reference in their entirety.

In any of the above embodiments, adsorbent materials, including the first and second adsorbent materials may be provided as shaped, formed or extruded adsorbent particles or monoliths. Such particulate or monolithic adsorbent materials may comprise any active adsorbent compounds suitable to adsorb specific contaminant and/or diluent gas components present in any feed gas stream of interest. Such adsorbent compounds may include without limitation, crystalline molecular sieves (including zeolites and titanosilicates), activated carbons including carbon molecular sieves, silica gels, aluminas, and combinations thereof. Alternatively, adsorbent materials, including the first and second adsorbent materials may be provided as structured adsorbent layers, such as formed thin adsorbent sheets. Such adsorbent sheets may comprise adsorbent materials with or without additional support and/or binder materials. Adsorbent sheets may be arranged to provide flow channels, thereby producing a high surface area, parallel passage adsorbent structure with having substantially lower flow channel pressure drop relative to some conventional particulate adsorbent materials arranged in packed beds. Such adsorbent structures may incorporate any suitable adsorbent compounds, which may include without limitation, crystalline molecular sieves (including zeolites and titanosilicates), activated carbons including carbon molecular sieves, silica gels, aluminas, microporous polymeric adsorbents and combinations thereof. Suitable support materials for incorporation in some adsorbent sheets as described above may include without limitation, metal mesh or foil, woven or non-woven scrim or fabrics comprising glass, mineral, carbon or cellulosic fibers, or in the case of activated carbon adsorbent materials, activated carbon fabric or cloth may be used as a self-supporting adsorbent sheet material. Additional embodiments may incorporate first and second adsorbents formed as adsorbent sheets and structures incorporating formed adsorbent sheets as disclosed in previously filed U.S. patent application Ser. No. 10/041,536, the contents of which are herein incorporated by reference in their entirety.

In a further embodiment, an initial gas stream comprising at least one contaminant component and at least one desired product component but no diluent component may be substantially separated into a product gas enriched in the desired product component and an exhaust gas comprising the at least one contaminant component by deliberately adding a suitable diluent gas component to the initial gas stream, to produce a feed gas stream suitable for separation according to the present methods and systems. In such a way, the desirably enhanced separation performance (including enhanced recovery of desired product in the case of PSA processes) of the methods and systems may be applied to initial gas streams not originally including a diluent component. Further, in applications where the desired product gas stream comprises both a principal desired product component, and some quantity of the diluent gas component, the present disclosure provides a solution to adsorptively remove substantially all of the deleterious contaminant component from the product gas stream, and control the quantity of the diluent component in the product gas stream relative to the desired product gas component by way of controlling the degree of adsorption of the diluent component in the second adsorption zone.

In an exemplary embodiment, the feed gas mixture may comprise natural gas, wherein the contaminant component may comprise carbon dioxide, the diluent component may comprise nitrogen, and the desired product component may comprise methane. In such an embodiment, a first adsorbent material in the first adsorbent zone may comprise activated alumina, and a second adsorbent material may comprise a titanosilicate material such as ETS-4 such that the methods and systems are effective to produce a product gas enriched in methane, and substantially free of carbon dioxide, wherein the passage of nitrogen gas previously adsorbed on the titanosilicate material through the activated alumina material during desorption is effective to purge at least a portion the adsorbed carbon dioxide from the alumina. This purging effect of the adsorbed diluent nitrogen reduces the required use of enriched methane product to purge the adsorption bed, thereby enhancing recovery of methane in the product gas stream.

In another exemplary embodiment, the feed gas mixture may comprise a reformate from a steam catalytic reformer wherein the contaminant component may comprise carbon monoxide, the diluent component may comprise carbon dioxide, and the desired product component may comprise hydrogen. In such an embodiment, a first adsorbent material in the first adsorbent zone may comprise a carbon monoxide selective adsorbent such as known metal or metal halide or oxide enhanced (such as by exchange or impregnation) adsorbent materials, and a second adsorbent material may comprise activated carbon such that the methods and systems are effective to produce a product gas enriched in hydrogen, and substantially free of carbon monoxide, wherein the passage of carbon dioxide gas previously adsorbed on the activated carbon material through the carbon monoxide selective adsorbent material during desorption is effective to purge at least a portion the adsorbed carbon monoxide from the first adsorbent material. This purging effect of the adsorbed diluent carbon dioxide reduces the required use of enriched hydrogen product to purge the adsorption bed, thereby enhancing recovery of hydrogen in the product gas stream. In a related embodiment to the above, the feed gas stream and diluent component may additionally comprise nitrogen gas. In such case, the adsorption bed may comprise an additional adsorption zone containing an additional adsorbent material such as an ion-exchanged zeolite.

In any of the above embodiments, the feed gas stream and the diluent component may comprise at least one additional diluent gas species, and the adsorption bed may comprise at least one additional adsorption zone containing at least one additional adsorbent material. Additionally, the feed gas stream and the contaminant component may comprise at least one additional contaminant gas species, and the adsorption bed may comprise at least one additional adsorption zone and one or more additional adsorbent material.

The methods and systems disclosed herein have been described above in reference to several exemplary embodiments. It is understood that further modifications may be made by a person skilled in the art without departing from the spirit and scope of the disclosure which are to be determined by the following claims.

We claim:

1. A method for substantially separating a carbon monoxide from a feed gas stream comprising carbon monoxide, carbon dioxide, and hydrogen, the method comprising:
    passing the feed gas stream through a first adsorption zone in contact with a first adsorbent material selective for carbon monoxide relative to carbon dioxide, and subsequently through a second adsorption zone in contact with a second adsorbent material selective for carbon dioxide relative to hydrogen;
    withdrawing from the second adsorption zone a product gas stream enriched in hydrogen; and
    regenerating the first adsorption zone by passing an exhaust gas stream from the second adsorption zone through the first adsorption zone, such that at least a portion of the carbon monoxide adsorbed on the first adsorbent material is purged from the first adsorption zone by carbon dioxide.

2. The method according to claim 1 wherein the first adsorbent material is a metal, metal halide, or oxide enhanced adsorbent material.

3. The method according to claim 1 wherein the second adsorbent material is activated carbon.

4. The method according to claim 1 wherein the feed gas stream additionally comprises nitrogen, and the feed gas stream is passed through a third adsorption zone in contact with a third nitrogen adsorbent material.

5. The method according to claim 1 wherein the feed gas stream is a reformate stream from a steam catalytic reformer.

6. The method according to claim 1 wherein the feed gas stream is a reformate stream from a catalytic partial oxidation reformer.

7. The method according to claim 1 wherein regenerating the first adsorption zone additionally comprises passing a product purge gas stream comprising hydrogen through the first adsorbent zone such that at least a portion of the carbon monoxide adsorbed on the first adsorbent material is purged from the first adsorption zone by the product purge gas stream.

8. The method according to claim 7 wherein the product purge gas stream is additionally passed through the second adsorbent zone such that at least a portion of the carbon dioxide adsorbed on the second adsorbent material is purged from the second adsorption zone by the product purge gas stream.

9. The method according to claim 2 wherein the second adsorbent material is activated carbon.

10. An adsorptive separation system for substantially separating a carbon monoxide from a feed gas stream comprising carbon monoxide, carbon dioxide, and hydrogen, the system comprising:
    an adsorption bed comprising a first adsorption zone containing a first adsorbent material selective for carbon monoxide relative to carbon dioxide, and a second adsorption zone containing a second adsorbent material selective for the carbon dioxide relative to hydrogen;
    a feed gas inlet configured to admit the feed gas stream into the adsorption bed such that the feed gas stream can pass through the first adsorption zone in contact with the first adsorbent material, and subsequently through the second adsorption zone in contact with the second adsorbent material;

a product gas outlet configured to withdraw a product gas stream enriched in hydrogen relative to the feed gas stream from the adsorption bed; and an exhaust gas outlet configured to withdraw an exhaust gas stream from the adsorption bed during regeneration of the adsorption bed, said exhaust gas stream comprising at least a portion of the adsorbed carbon monoxide from the first adsorption zone which has been purged from the first adsorbent material by carbon dioxide.

11. The system according to claim 10 wherein the first adsorbent material is a metal, metal halide, or oxide enhanced adsorbent material.

12. The system according to claim 10 wherein the second adsorbent material is activated carbon.

13. The system according to claim 11 wherein the second adsorbent material is activated carbon.

14. The system according to claim 10 wherein the adsorption bed further comprises a third adsorption zone containing a nitrogen adsorbent material.

15. The system according to claim 13 wherein the adsorption bed further comprises a third adsorption zone containing a nitrogen adsorbent material.

16. The system according to claim 10 wherein the adsorption bed is coupled to a steam catalytic reformer to receive a reformate stream as the feed gas stream.

17. The system according to claim 10 wherein the adsorption bed is coupled to a catalytic partial oxidation reformer to receive a reformate stream as the feed gas stream.

* * * * *